Oct. 17, 1961   A. J. BRYANT   3,004,766
VACUUM CHUCK
Filed Nov. 2, 1959   2 Sheets-Sheet 1

INVENTOR
Andrew J. Bryant

BY Mason, Fenwick & Lawrence
ATTORNEYS

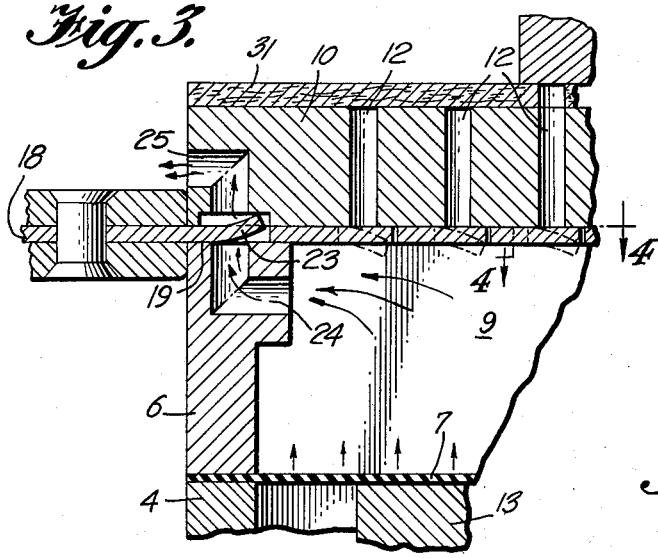
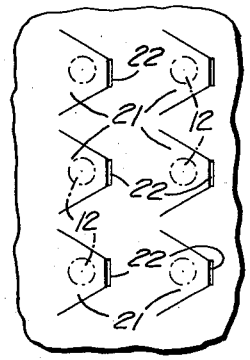
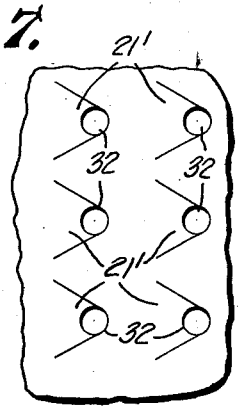
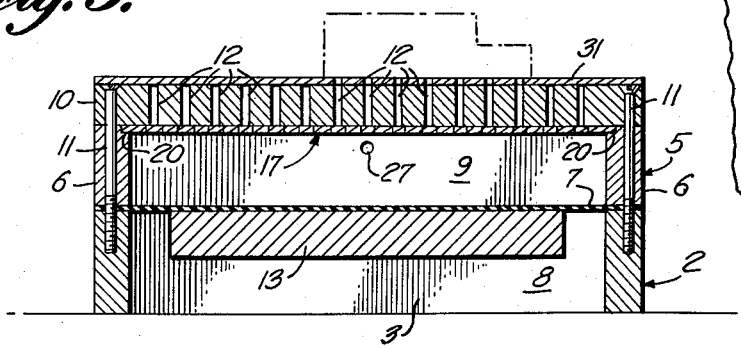
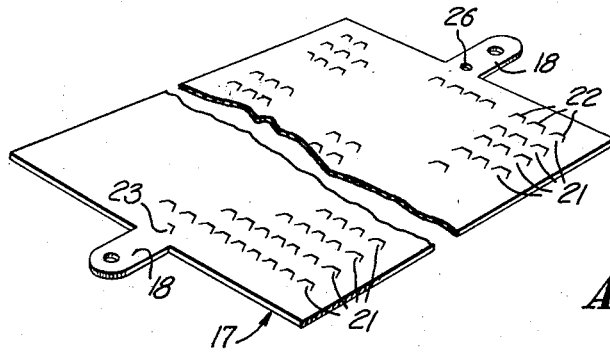

3,004,766
VACUUM CHUCK
Andrew J. Bryant, 900 Arthur Ave., Bristol, Pa.
Filed Nov. 2, 1959, Ser. No. 850,427
9 Claims. (Cl. 279—3)

This invention relates to vacuum chucks, and particularly to vacuum chucks specially adapted to use with small and irregularly shaped work-pieces, of such size and shape that they will not cover the face plate of the chuck.

Holding small and irregular shaped work-pieces so that additional work can be performed upon them has always presented a problem. With the advent of the electromagnetic chuck, the problem was solved insofar as work-pieces of ferro magnetic material was concerned. Non ferro magnetic materials such as titanium, nickel alloys, ceramics, etc., can be held by vacuum chucks, provided that the work-piece is of sufficient size to cover all of the orifices in the face plate.

The general object of the present invention is to provide a vacuum chuck which can be utilized to hold articles particularly of variable size and irregular shape, or a group of such articles.

Another object is to provide such a chuck which can be adapted to use with any suitable vacuum source, or with an electromagnetic chuck as the motive force for a pump built in the vacuum chuck.

A further object is to provide mats as cover sheets for the face plate of a vacuum chuck with the mats being perforatable in accordance with the port pattern of the underlying face plate and the contour of a selected work-piece, or group of work-pieces.

Yet another object is to provide a vacuum chuck having a control plate in association with a perforated face plate, with the control plate having valves to permit a pumping action in the vacuum chamber to create enough vacuum to hold the work-pieces, and which when moved to another position, will release the vacuum in the chamber.

Other objects of the invention will become apparent from the following description of practical embodiments thereof, when taken in conjunction with the drawings which accompany and form part of this specification.

In the drawings:

FIGURE 3 is an enlarged detail showing one corner of the structure shown in FIGURE 2;

FIGURE 4 is a fragmentary horizontal sectional view showing a valve plate, and is taken on the line 4—4 of FIGURE 3;

FIGURE 5 is a transverse, vertical section through the chuck, taken on the line 5—5 of FIGURE 2;

FIGURE 6 is a perspective view of the valve plate used with the chuck;

FIGURE 7 is a fragmentary plan view of a slightly modified valve sheet; and

Figure 1:
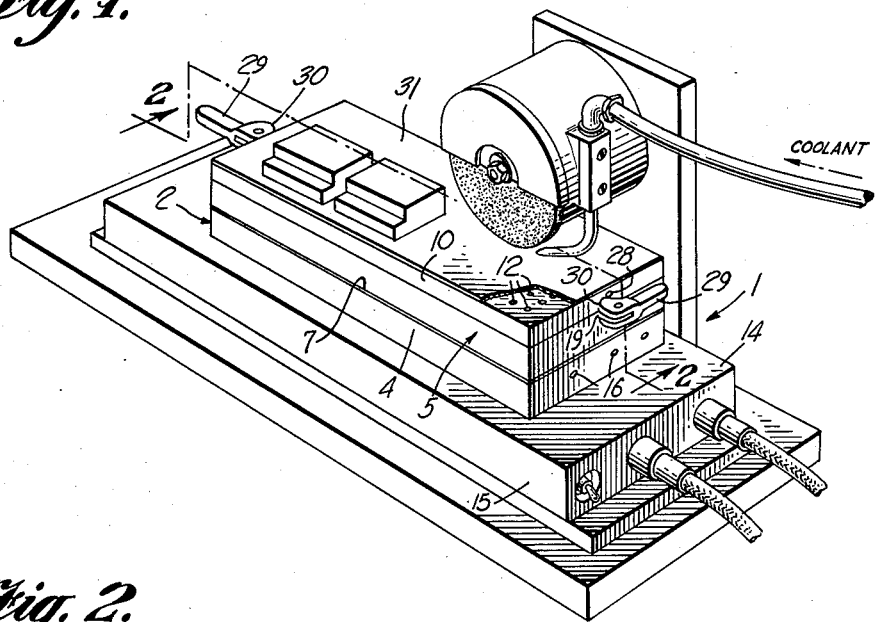
FIGURE 1 is a perspective view of a vacuum chuck embodying the principles of the present invention, shown mounted upon an electromagnetic chuck.

In general, the invention concerns a vacuum chuck having a perforated face plate and mats which may be selectively perforated in accordance with the face plate pattern in those areas which are to underlie a work-piece. This structure can be supplemented by a valve sheet, slidably mounted beneath the face plate to place valve flaps in communication with the face plate openings, or to bring open ports into registry with the plate openings, to assist in building a vacuum in the chuck and in quickly releasing the vacuum therein. The chuck may contain a pumping diaphragm for operation by an electromagnetic chuck, or it may have its chamber connected to a separate vacuum source.

Referring to the drawings in detail, there is shown in FIGURES 1 to 5 a vacuum chuck 1 composed of a box-like base section 2, having an open bottom 3 and side walls 4, an upper body section 5, having walls 6 of the same configuration as the side walls 4. The upper body section is superimposed on the base section, with a flexible sheet 7 interposed and forming both a gasket between the meeting edges of the walls of the two sections and a diaphragm extending completely across the housing formed by the two sections, and dividing the area within the housing into a lower chamber 8 and an upper chamber 9. The top of the chuck is closed by a face plate 10. The several body sections and the face plate are held together by screws 11.

Face plate 11 is perforated over substantially its entire area, only the peripheral zones being without openings. The openings 12 may be arranged in any desired pattern. They are shown forming rather closely spaced rows extending longitudinally and transversely of the plate. These openings form vacuum ports, and it is through them that the vacuum operates upon work-pieces to be held by the chuck.

The diaphragm 7 may be of any suitable flexible material, such as rubber, or a synthetic material having somewhat the same characteristics of flexibility and resiliency. The diaphragm has one or more lengths 13 of ferro magnetic material fixed to its underside. When the chuck is placed upon the face plate 14 of an electromagnetic chuck 15 and the chuck energized, the ferro magnetic members 13 will be attracted, drawing down the diaphragm. If the electromagnetic chuck is deenergized, the diaphragm will spring back to its normal position. Thus, the diaphragm will act as a pump to draw air through the openings 12 in the vacuum chuck face plate 10. It will be noted that ports 16 are provided in the walls 4 of the housing base sections, so that air may move freely in and out of the lower chamber 8 to permit free action of the diaphragm.

Figure 2:
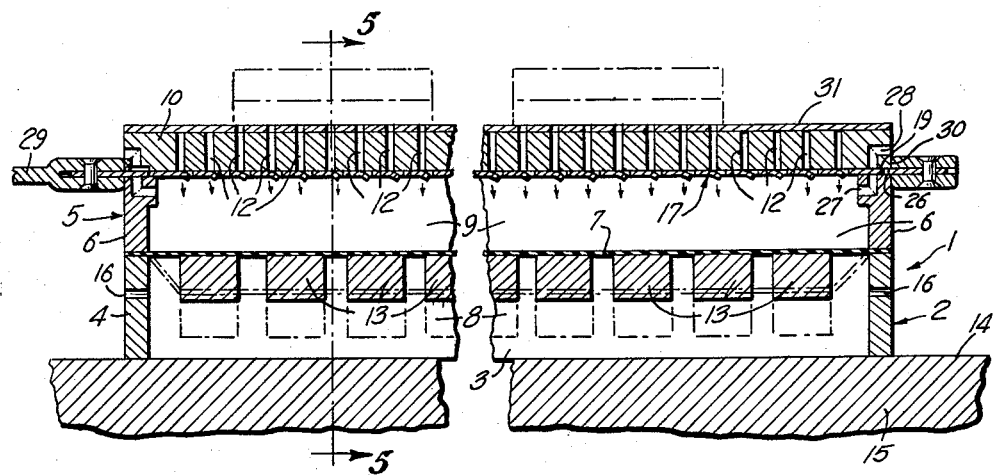
FIGURE 2 is a longitudinal, vertical section through the chuck shown in FIGURE 1.

In order to control the movement of air through the openings 12 in the face plate, and to provide means whereby the vacuum within the chuck upper chamber 9 may be quickly relieved, a valve sheet 17 is provided, mounted for sliding action beneath the face plate 10. The sheet is of rectangular shape, having arms 18 projecting centrally of the ends. The arms 18 seat in recesses 19 in the top edges of the end walls 6 of the upper body section, and these recesses with the overlying edges of the face plate form slots in which the arms may slide to move the sheet relative to the face plate. The side walls 6 of the upper section are rabbeted along their top inner edges as at 20, to serve as supporting slides for the sheet. The sheet is preferably formed from thin stock having considerable resiliency. The sheet is struck to provide a plurality of spring valves 21, one for each opening in the face plate. When the sheet is properly positioned beneath the face plate, there will be a valve 21 directly beneath each opening 12, as shown in FIGURES 2 and 3. The flap valves are sufficiently long so that they will project beyond the face plate opening on either side thereof, so that the free end of the valve will rest against a solid portion of the underside of the face plate. It will be obvious from FIGURES 2 and 3 of the drawings that the valves may flex downwardly under the pull of vacuum in the upper chamber to uncover the openings 12 for communication with the vacuum source. When the vacuum is relieved, the valves will return to position against the underside of the face plate, closing the openings above.

It will be noted that the valve sheet is perforated adjacent the free end of each valve to provide a plurality of through ports 22. These ports are in the form of slots and are arranged in the same order as the valves and the openings 12, so that when the sheet is shifted longitudinally of the chuck housing the ports will be positioned beneath the openings 12, providing an open vent between the holes and the upper chamber 9. Thus, when the sheet is moved in one direction the valves will be beneath the openings 12, and when shifted in the other direction the ports 22 will be in communication with the openings.

One arm 18 of the valve sheet has a valve 23 struck from it. This valve is adapted to lie across a port 24 in the upper section of the body, and to control communication from the port 24 to a port 35 in the face plate. Port 24 opens to the interior of the upper chamber 9 and port 25 opens to atmosphere. Thus, when valve 23 is in alignment with the ports 24 and 25 and opened, the chamber 9 will be open to atmosphere. The port 25 is enlarged adjacent its bottom to allow the free end of the valve 23 to move upwardly. The free end of the valve 23 is held against downward movement, however, by contact with the bottom of the recess 19.

It will be evident from the drawings and from the above description that the valves 21 are free to flex downwardly but are held against upward movement, while valve 23 can flex upwardly but is held against downward movement. By reason of their arrangement, downward movement of the diaphragm will open the valves 21 to draw air in through the openings 12 while the valve 23 is held closed. When the diaphragm moves up the valves 21 will close and excess air will be forced out of chamber 9 through valve 23. If the openings 12 are closed by a work-piece, or in any other manner, this pumping action will serve to create a vacuum in the chamber 9 and the openings 12 to hold the work-piece in place against the face plate.

The opposite arm 18 is provided with a port 26 to open and close a venting passage for the chamber 9 formed by a port 27 in the end wall 6, leading from the interior of chamber 9 to the recess 19, and a port 28, through the face plate from a point above the recess 19 to atmosphere. Port 26 is arranged to open the venting passageway when the valve sheet is moved to a position where the ports 22 are in communication with the openings 12. By this arrangement, the openings 12 may be vented to atmosphere when desired to break the vacuum holding work-pieces against the chuck face plate.

Due to the thinness and flexibility of the valve sheet 17, the sheet can be moved more efficiently by pulling than by pushing. To this end, cam levers 29 are pivotally attached to the arms 18. The levers are arranged to have their cam faces 30 work against the outside of the chuck housing. The levers are designed to be operated in alternation to move the sheet 17 in opposite directions. To do this one lever will be lifted and the other depressed. The sheet will be drawn toward the depressed lever. To move the sheet in the opposite direction, the depressed lever must first be lifted and the other then depressed.

The structure described will be adequate to rigidly hold a work-piece or group of work-pieces which will overlie and close the tops of all of the openings 12. If small irregularly shaped work-pieces are used, some of the openings 12 will be uncovered and, consequently, no vacuum can be drawn in the upper chamber. To adapt the chuck to grip small, irregularly shaped work-pieces, mats 31 are provided to be placed over the face plate 10. These mats can have the work-pieces arranged upon them to determine their shape and position, and the mats then perforated in accordance with the perforation pattern of the face plate in those areas which will be covered by the work-pieces. When the mats are placed on the face plate and the work-pieces put in position thereon, all of the perforations in the mat will be covered by the work-pieces, and the unneeded openings in the face plate will be closed by unperforated areas of the mat. Thus, vacuum may be drawn in the chamber 9 and in the openings 12 and the perforations in the mat to pull the work-piece tightly against the mat and hold the mat immovable relative to the face plate. The mats are preferably made of a material having some compressibility so that the work-pieces will be drawn into the mat for perfect sealing, and if desired may be made of disposable material.

When the device is to be used, it is placed upon an electromagnetic chuck, as shown in FIGURE 1, and as described, and a mat is perforated in accordance with the shape and size of the work-piece and placed upon the face plate of the vacuum chuck. The work-pieces are arranged on the mat, and the valve sheet shifted to place the valves 21 beneath the openings 12 and the valve 23 in position to control the ports 24 and 25. At this time, the port 26 will not be in alignment with the ports 27 and 28 so that the vent passage will be closed. By turning the electromagnetic chuck on and off, the diaphragm can be caused to pulsate and create a vacuum in the chamber 9 and the openings 12 to draw the work-piece tightly against the mat. When the work is finished, the valve sheet may be shifted to open the venting passage and place the ports 22 in communication with the openings 12. This breaks the vacuum and frees the work-piece. The mat can be re-used if similar work-pieces are to be held, or put aside or thrown away if the next pieces are of different size or shape. The mats not only serve to block off unused openings in the face plate, but they collect the debris accumulated from the working operation and the coolant used on the working member, thus preventing clogging of the openings in the face plate.

In FIGURE 7 a slightly modified valve sheet is shown, wherein the ports 32 are round holes instead of slits as those formerly described. These holes can be the size of the openings 12 so that more rapid venting can be obtained.

Figure 8:
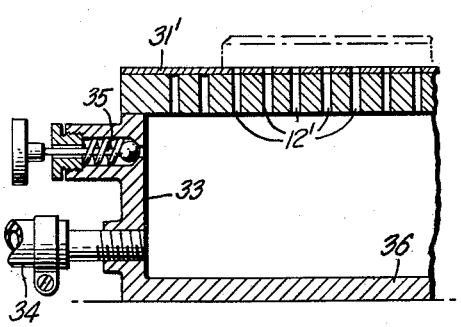
FIGURE 8 is a partial vertical section through a chuck housing connected to an outside vacuum source.

FIGURE 8 shows a variation of the device previously described. In this form the chuck housing 33 is connected by a suitable hose line 34 to any source of vacuum. The valve sheet is eliminated, but the mats are used as before. The mats will close all unneeded openings in the face plate so that a vacuum will be drawn in those which are open to hold the work-pieces rigidly in place. Any suitable valve 35 may be employed to vent the housing. In this arrangement, where there is no diaphragm, the housing may be closed by a bottom 36.

While in the above practical embodiments of the invention have been disclosed, it will be understood that the details of structure shown and described are merely by way of example, and the invention may take other forms within the scope of the appended claims.

What is claimed is:

1. A vacuum chuck for use with an electromagnet comprising, a hollow body, a perforated face plate across the top of the body, a flexible diaphragm spanning the body and dividing the body into upper and lower chambers, with the perforated face plate forming one side of the upper chamber, valve means on the body controlling communication between the upper chamber and atmosphere, and elements of magnetic material fixed to the diaphragm, whereby the chuck may be positioned over an electromagnet and by pulsating operation of the electromagnet attract and release the magnetic elements to cause pulsating movement of the diaphragm to draw a vacuum in the upper chamber.

2. A vacuum chuck as claimed in claim 1 wherein the said valve means comprises a valve sheet having a plurality of independent valves, one for each perforation in the face plate, openable under subatmospheric pressure within the upper chamber, the sheet being positionable so as to locate one valve under each face plate perforation.

3. A vacuum chuck as claimed in claim 2 wherein the valve sheet has a plurality of ports equal in number to the valves with one port adjacent each valve, and a vent port in the sheet for venting the upper chamber, said sheet being mounted for sliding movement relative to the face plate, said ports and vent port being arranged so that when the ports are in communication with the face plate perforations the vent port is open for venting the upper chamber.

4. A vacuum chuck as claimed in claim 1 wherein a mat is positioned on the face plate, the mat being perforated in accordance with the pattern of perforations in the face plate in the area to be overlain by a work-piece.

5. A vacuum chuck as claimed in claim 4 wherein the said valve means comprises a valve sheet underlying the face plate and having means to valve the lower ends of the perforations in the face plate and means to vent the upper chamber.

6. A vacuum chuck comprising, a hollow body defining a vacuum chamber, a rigid perforated face plate across the top of the body, and a mat on the face plate, the mat being perforated in accordance with the pattern of perforations in the face plate in the area to be overlain by a work-piece.

7. A vacuum chuck as claimed in claim 6 wherein there is a valve sheet mounted under the face plate for sliding movement relative thereto, said valve sheet having valve means therein to underlie each of the perforations in the face plate when the sheet is in one position, the valve means in the sheet to operate to open under subatmospheric pressure in the vacuum chamber when the sheet is in said one position, said sheet having a plurality of ports, one to register with each perforation in the face plate when the sheet is in another position, and a vent valve to open the vacuum chamber to atmosphere when the sheet is in said other position.

8. A vacuum chuck as claimed in claim 7, wherein a flexible diaphragm is positioned across the hollow body spaced below and parallel to the face plate to form a movable wall for the vacuum chamber.

9. A vacuum chuck for use with an electromagnet comprising, a hollow body having a face plate with perforations therein and a flexible bottom, valve means openable under subatmospheric pressure within the hollow body to open the face plate perforations to the interior of the hollow body, valve means openable under superatmospheric pressure within the hollow body to open the hollow body to atmosphere, elements of magnetic material fixed to the flexible bottom of the hollow body, and means to support the hollow body with the flexible bottom spaced from a surface upon which the chuck is placed, whereby the chuck may be positioned on an electromagnet and by pulsating operation of the electromagnet attract and release the magnetic elements to cause pulsating movement of the flexible bottom to evacuate air from the hollow body.

References Cited in the file of this patent
UNITED STATES PATENTS

| | | |
|---|---|---|
| 2,367,839 | Grover | Jan. 23, 1945 |
| 2,414,574 | Williams | Jan. 21, 1947 |
| 2,782,574 | Copold | Feb. 26, 1957 |